United States Patent
Freese et al.

(10) Patent No.: US 6,270,037 B1
(45) Date of Patent: *Aug. 7, 2001

(54) RAPID RESPONSE ATTITUDE CONTROL LOGIC FOR SHAFT-DRIVEN LIFT FAN STOVL ENGINE

(75) Inventors: Richard A. Freese, Stuart; Julio Perez, Hobe Sound, both of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/212,924

(22) Filed: Dec. 16, 1998

(51) Int. Cl.[7] .................................................. B64C 29/00
(52) U.S. Cl. ..................... 244/12.3; 244/23 B; 60/235; 60/233
(58) Field of Search .................... 244/12.3, 197, 244/23 B, 53 R; 60/223, 235, 236, 237, 239, 242, 39.29

(56) References Cited

U.S. PATENT DOCUMENTS

| | | |
|---|---|---|
| 4,809,500 | 3/1989 | Roberts, Jr. ............................ 60/235 |
| 4,928,482 | 5/1990 | Pollak et al. ...................... 60/39.161 |
| 4,984,425 * | 1/1991 | Smith . |
| 5,133,182 | 7/1992 | Marcos ............................. 60/39.161 |
| 5,174,105 * | 12/1992 | Hines . |
| 5,197,280 * | 3/1993 | Carpenter et al. . |
| 5,209,428 * | 5/1993 | Bevilaqua et al. . |
| 5,303,545 * | 4/1994 | Larkin . |
| 5,345,757 * | 9/1994 | MacLean et al. . |
| 5,440,490 * | 8/1995 | Summerfield . |
| 5,454,531 * | 10/1995 | Melkuti . |
| 5,687,564 * | 11/1997 | Kelly et al. . |
| 5,752,379 * | 5/1998 | Schafer et al. . |
| 5,857,321 * | 1/1999 | Rajamani et al. . |

* cited by examiner

Primary Examiner—Charles T. Jordan
Assistant Examiner—Tien Dinh

(57) ABSTRACT

A short take-off and vertical landing ("STOVL") aircraft has a conventional gas turbine engine that is selectively mechanically connected to a vertically-oriented lift fan by a drive shaft when the aircraft operates in a vertical flight mode. An engine control provides for rapid response attitude control of the aircraft when the pilot initiates desired changes in the attitude (i.e., pitch, roll and/or yaw) of the aircraft. The control achieves the rapid response by varying both the inlet guide vanes of the lift fan and the area of the engine nozzle. These variations result in a substantially constant low rotor speed, which facilitates the desired rapid attitude response and corresponding aircraft control.

20 Claims, 3 Drawing Sheets

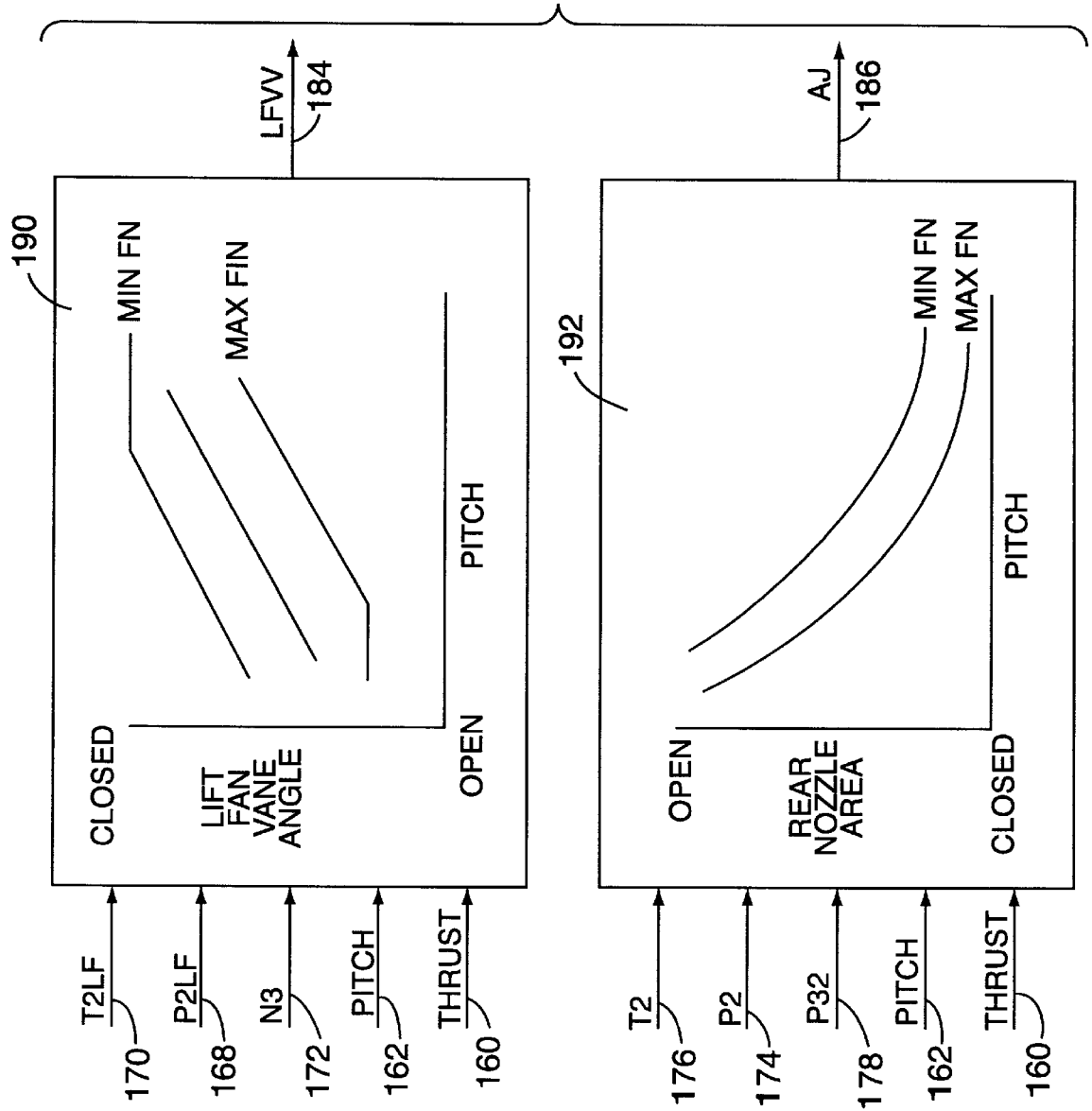

RAPID RESPONSE ATTITUDE CONTROL LOGIC FOR SHAFT-DRIVEN LIFT FAN STOVL ENGINE

CROSS REFERENCE TO RELATED APPLICATION

The subject matter of this application is related to the subject matter of commonly owned U.S. patent application Ser. No. 09/212,908, filed on even date herewith, entitled "Rapid Thrust Response Control Logic for Shaft-Driven Lift Fan STOVL Engine".

TECHNICAL FIELD

This invention relates generally to control of gas turbine engines, and more particularly to attitude control of a STOVL aircraft having a gas turbine engine and a shaft-driven lift fan selectively coupled to the engine during vertical flight modes of the STOVL aircraft.

BACKGROUND ART

Short take-off and vertical landing ("STOVL") military aircraft, also known as vertical and/or short takeoff and landing ("V/STOL", "VTOL", or "STOL") aircraft (hereinafter all of which are referred to as a "STOVL" aircraft for convenience), are used when a single aircraft is needed to attain both horizontal and vertical flight modes. A well-known example is the AV-8B "Harrier" type of STOVL aircraft. The vertical flight modes comprise aircraft takeoffs and landings from, e.g., aircraft carriers or other limited-length runways. Such aircraft generally include one or more conventional gas turbine engines that power the aircraft in both the horizontal and vertical flight modes.

To achieve the vertical thrust necessary for vertical flight modes, each engine on the STOVL aircraft may be coupled in some manner to one or more auxiliary lift fans. Depending upon their placement and orientation within the STOVL aircraft, the lift fans may also be used in conjunction with the associated engines to control the attitude of the aircraft (i.e., to control the aircraft pitch, roll, and/or yaw) during vertical flight. The lift fans are typically disposed within the aircraft fuselage and separate from the engine. The primary airflow axis of the lift fan is oriented vertically within the aircraft (i.e., the fan exhaust is pointed downward to generate vertical lift for thrust and control), while the primary airflow axis of the engine is oriented in the conventional horizontal direction. However, the engine exhaust is typically adjustable in a well-known manner from a horizontal position for normal horizontal flight to a vertical position for vertical flight modes. This way, the direction of the thrust produced by the engine may also be varied between horizontal and vertical.

The lift fan may be selectively aerodynamically coupled to the fan exhaust or turbine exhaust of the engine, or the lift fan may be selectively mechanically coupled to the fan or low rotor spool of the engine by a rotating drive shaft. In the latter case, a clutch and gearbox mechanism is usually employed to selectively engage and disengage the lift fan with the gas turbine engine. Examples of these types of well-known propulsion systems for STOVL aircraft are given in U.S. Pat. Nos. 5,464,175, 5,312,069, 5,275,356, 5,209,428, which are all hereby incorporated herein by reference.

Generally, proper and stable attitude control of a STOVL aircraft during vertical flight modes is inherently difficult to achieve. The amount of force required to attain the desired aircraft attitude control, together with the reaction time of this force, is critical to proper aircraft control in vertical flight. Current, known attitude controls for STOVL aircraft burden the aircraft with extra weight. They also cause the engine to run at temperatures exceeding nominal operation.

For example, the attitude control system for the Harrier STOVL aircraft consists of additional and separate control system hardware. In the Harrier aircraft, that hardware weighs approximately 200 pounds and has no other function than to provide control power during vertical flight modes. The Harrier's attitude control system also has an undesired inherent coupling between overall system thrust and the use of control power for aircraft attitude. Further, these attitude control requirements significantly increase engine turbine temperatures in the Harrier aircraft to the extent that a water injection system is needed to meet turbine durability requirements. Clearly, the additional attitude control system for the Harrier aircraft poses undesired burdens on the aircraft, such as weight, cost and the risk e.g., of component failure.

DISCLOSURE OF INVENTION

An object of the present invention is to provide for rapid response attitude control of a STOVL aircraft having a gas turbine engine and a shaft-driven lift fan selectively coupled to the engine during vertical flight modes of the STOVL aircraft.

Another object of the present invention is to provide for such rapid response attitude control of the STOVL aircraft while minimizing the possibility of aircraft instability.

A further object of the present invention is to provide for such rapid response attitude control of the STOVL aircraft by controlling the movement of existing aircraft components having relatively high response rates.

A still further object of the present invention is to provide for such rapid response attitude control of the STOVL aircraft to thereby overcome the shortcomings of the prior art by eliminating the need for a separate attitude control system, thereby also eliminating the attendant problems (e.g., weight and risk) with such a separate attitude control system.

Yet another object of the present invention is to provide for such rapid response attitude control of the STOVL aircraft by keeping constant the engine low rotor speed.

Still another object of the present invention is to provide for such rapid response attitude control of the STOVL aircraft without requiring any additional engine variable geometry, actuation or system components.

The present invention is predicated on the fact that rapid response of a STOVL aircraft to a pilot-initiated change in the attitude of the aircraft can be achieved by varying both the angle of the lift fan inlet guide vanes and the area of the engine nozzle, thereby keeping constant the speed of the low-pressure rotor spool of the engine.

According to the present invention, a STOVL aircraft has a gas turbine engine that is selectively mechanically connected to a lift fan by a drive shaft during aircraft operation in vertical modes of flight. An engine control is employed having logic that provides for rapid response attitude control of the aircraft when the pilot initiates desired changes in attitude. The logic employed consists of varying both the inlet guide vanes of the lift fan and the area of the engine exhaust nozzle. These variations result in a constant low rotor speed, which facilitates the desired rapid attitude response of the STOVL aircraft. In a preferred exemplary embodiment, both the lift fan and gas turbine engine are disposed within the STOVL aircraft along its longitudinal axis (i.e., front to back) such that the control logic implements attitude control of the aircraft along the pitch axis of the aircraft.

The above and other objects and advantages of the present invention will become more readily apparent when the following description of a best mode embodiment of the present invention is read in conjunction with the accompanying drawings.

BRIEF DESCRIPTION OF DRAWINGS

FIG. 3 is a more detailed block diagram of the engine control of FIG. 1 showing the rapid response attitude control logic according to the present invention.

BEST MODE FOR CARRYING OUT THE INVENTION

Figure 1:
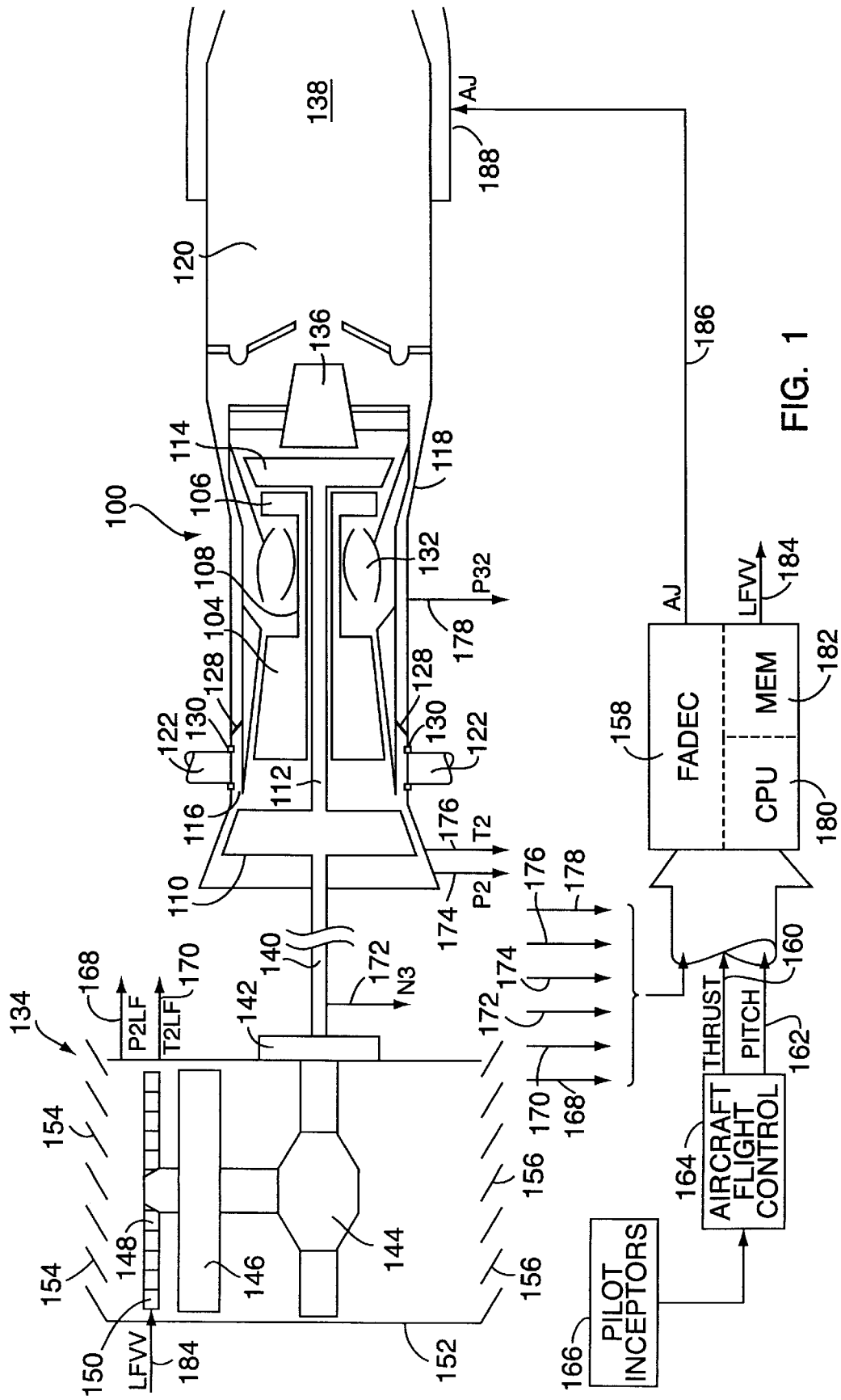
FIG. 1 is a schematic diagram of a gas turbine engine having a shaft-driven lift fan selectively connected thereto, together with a block diagram of an engine control having rapid response attitude control logic implemented therein in accordance with the present invention.
Figure 2:
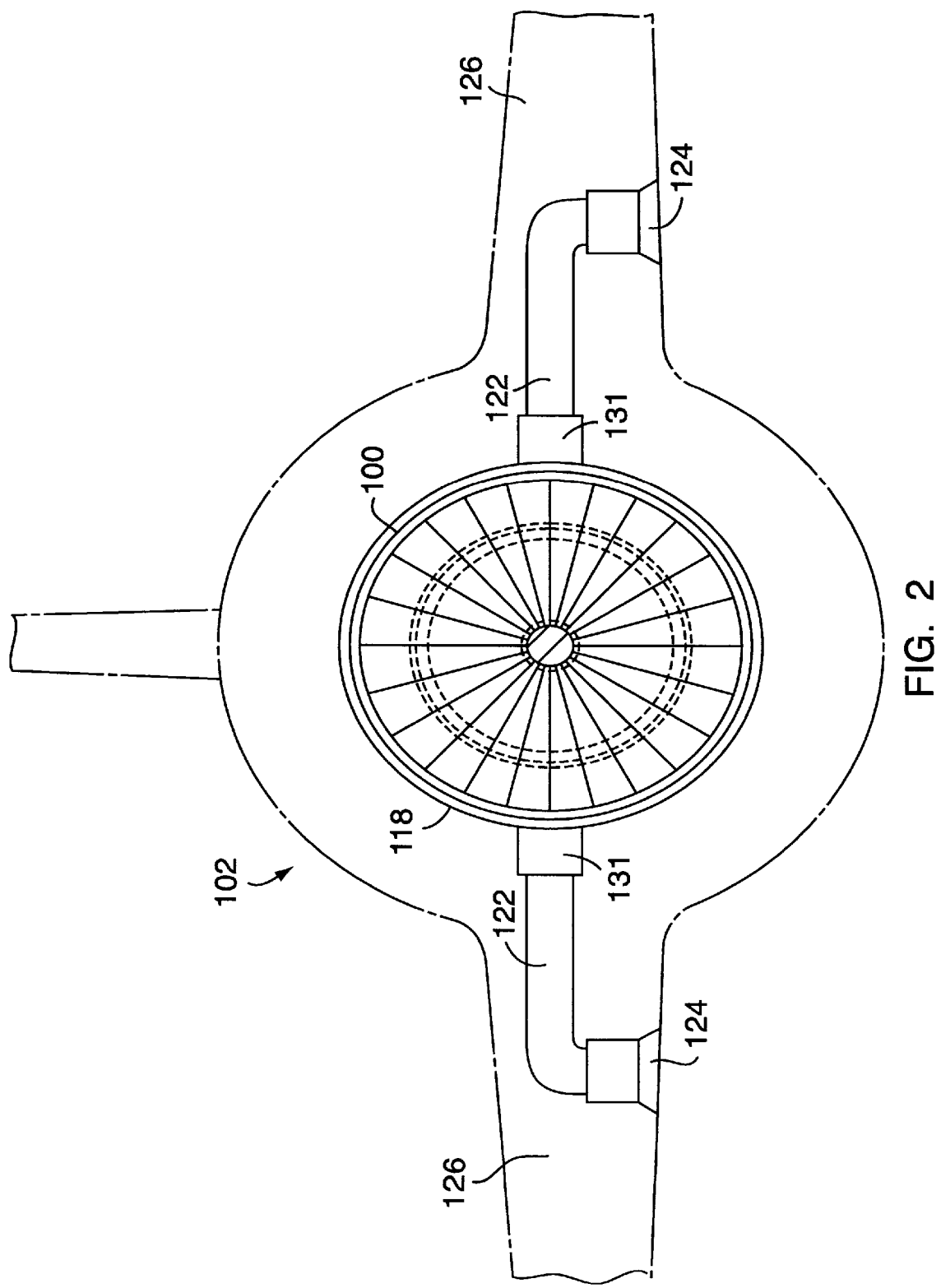
FIG. 2 is a cross section view of a portion of a STOVL aircraft including the gas turbine engine and control of FIG. 1, together with a pair of roll control ducts for controlling the roll attitude of the aircraft.

Referring to FIGS. 1 and 2, there illustrated is a conventional gas turbine engine 100 for powering a STOVL military aircraft 102 of the type described and illustrated in the aforementioned U.S. Pat. No. 5,209,428, which has been previously incorporated herein by reference. The STOVL aircraft 102 may also comprise the aforementioned Harrier aircraft. A cross section of a portion of the STOVL military aircraft 102, as illustrated in FIG. 5 of U.S. Pat. No. 5,209,428, is substantially reproduced as FIG. 2 herein. The engine 100 may comprise the model F119, provided by Pratt & Whitney, a division of United Technologies Corporation, the assignee of the present invention. That jet engine is of the well-known, twin spool, axial flow, fan type, but the invention is not to be limited as such. Other engine types (e.g., single spool) may be utilized within the broadest scope of the present invention.

As illustrated in FIG. 1, the exemplary engine 100 consists of a high-pressure rotor having a high-pressure compressor 104 comprised of a plurality of compressor stages. Each high-pressure compressor stage comprises a rotor assembly rotatably driven by a high-pressure turbine 106 that includes a corresponding plurality of high-pressure turbine stages that comprise similar rotor assemblies. As is well known, a compressor or turbine rotor assembly generally consists of a rotating disk having a plurality of blades attached thereto. Associated stator vane assemblies, each comprising a plurality of stationary blades or vanes, may also be included within the compressor 104 and turbine 106 to direct the airflow into the rotor assemblies. A rotatable hollow shaft 108 connects the high-pressure compressor 104 and high-pressure turbine 106 together to form the high-pressure spool.

Similarly, the low-pressure rotor or spool consists of a combination 110 of a fan and a plurality of low-pressure compressor stages that comprise rotor assemblies combined together and connected by a rotatable shaft 112 to the low-pressure turbine 114. The shaft 112 of the low-pressure spool is disposed within the hollow shaft 108 of the high-pressure spool. The low-pressure turbine 114 provides power to rotate the fan and low-pressure compressor combination 110.

During normal horizontal flight of the STOVL aircraft 102, the fan 110 discharges a portion of its exhaust through an outer annular passageway 116 disposed next to the engine casing 118 and out toward an engine exhaust nozzle 120 where it combines with the core engine exhaust from the low-pressure turbine 114. Also, the fan and low-pressure compressor combination 110 discharges a portion of its exhaust into the inlet of the high-pressure compressor 104 and eventually out through the engine core to the engine exhaust nozzle 120. As such, the engine operates as a mixed flow engine during horizontal flight.

In contrast, during vertical flight, that portion of the fan exhaust may, instead, be directed out through ducts 122 and to the roll control nozzles 124 located within the aircraft wings 126 in a known manner to control the roll attitude of the aircraft 102, as described in greater detail hereinafter with respect to FIG. 2. This is accomplished by closing a plurality of doors 128 disposed in the outer annular passageway 116, together with secondary seals 130 at the entrance to the ducts 122 next to the engine casing 118. FIG. 1 illustrates the doors 128 closed and, thus, the fan exhaust being directed out to the roll ducts 122. Yet, the low-pressure compressor 110 continues to discharge into the inlet of the high-pressure compressor 104 and subsequently to and through the engine core. As such, the engine 100 operates as a separate flow engine while in the vertical flight mode.

A gas generator burner 132, typically of the annular type, is interposed between the outlet of the high-pressure compressor 104 and the inlet of the high-pressure turbine 106. Fuel is controllably provided to the burner 132 from a fuel supply (not shown). The burner 132 serves to combust the fuel to provide an energized working medium for powering the high- and low-pressure turbines (and, thus the high and low rotor spools along with the lift fan 134, when coupled to the engine 100) and for generating thrust to power the aircraft 102. The exemplary military STOVL aircraft engine 100 may also include an augmentor or afterburner 136, along with the variable jet area nozzle 138.

Also, as is well known for STOVL aircraft 102 (and as described and illustrated in U.S. Pat. No. 5,209,428), the exhaust nozzle 138 may be designed to divert engine exhaust flow horizontally for normal horizontal flight, vertically downward for takeoffs and landings, and into intermediate positions when transitioning between vertical and horizontal flight. Although not illustrated in FIG. 1, it is well known in the art that the exhaust nozzle 138 may include a diverter comprising a plurality of telescoping sections. When in the vertical flight mode, the telescoping sections are extended outward and downward to divert engine exhaust air downward to provide additional vertical upward thrust for the aircraft 102.

Still referring to FIG. 1, the engine 100 is mechanically coupled by a drive shaft 140 to an auxiliary lift fan 134 that, in a preferred exemplary embodiment, is disposed forward of the engine 100 in the aircraft 102. As such, the engine 100 and lift fan 134 are disposed along the longitudinal axis (i.e., front to back) of the STOVL aircraft 102. The lift fan 134 may be similar to that described and illustrated in U.S. Pat. No. 5,209,428. The drive shaft 140 connects the lift fan 134 to the front of the low rotor spool of the engine 100 through a clutch 142. The clutch 142 selectively connects and disconnects the engine 100 from the lift fan 134 for desired STOVL aircraft operation in vertical and horizontal flight modes, respectively. The lift fan 134 also includes a gearbox/transmission assembly 144 that is coupled at one end to a lift fan rotor 146 and to the drive shaft 140 at the other end via the clutch 142.

The lift fan 134 also includes the lift fan rotor 146. The lift fan rotor 146 is similar to an engine rotor stage described above in that the lift fan rotor comprises, in a preferred exemplary embodiment, two counter-rotating disks each having a plurality of blades attached thereto. Each lift fan rotor disk has a corresponding set of variable inlet guide vanes 148 mounted on top of the associated disk. The vanes 148 are used to adjust the flow of inlet air through the fan rotor 146 to thereby control the power or thrust extracted from the inlet fan 134. The angular position of the vanes 148 is typically adjusted through use of suitable actuators 150, such as a single hydraulic actuator that serves to adjust the vanes 148 for both rotor disks. The angular position of the vanes 148 is controlled to achieve constant low rotor speed and, thus, rapid response to desired attitude changes, in accordance with the control logic of the present invention, as described in detail hereinafter.

The lift fan 134 is surrounded by a vertically-oriented duct 152 with an entrance covered by a plurality of moveable doors 154. The entrance doors 154 control the flow of air into the inlet of the lift fan 134. Generally, the entrance doors 154 are fully opened during vertical flight modes, and are fully closed during horizontal flight modes. The entrance doors 154 are shown in FIG. 1 in a partially opened position. The lift fan 134 also has an exit covered by a plurality of moveable doors 156. These exit doors 156 are controlled in a similar manner to the entrance doors 154. However, it should be understood that the position of both the entrance and exit doors forms no part of the control logic of the present invention.

Also illustrated in FIG. 1, in block diagram form, is a portion of an engine control 158 having logic that implements the rapid response attitude control logic of the present invention. The control 158 preferably comprises a full authority digital electronic control ("FADEC") provided by Hamilton Standard, a division of United Technologies Corporation, the assignee of the present invention. Besides implementing the control logic of the present invention, the FADEC control 158 typically carries out other known engine and lift fan control functions, which form no part of the present invention and, thus, are not described herein.

In carrying out the attitude control logic of the present invention, the FADEC control 158 monitors a plurality of engine operating parameters that are input thereto. Two of the input signals, the THRUST request signal on a line 160 and the PITCH request signal on a line 162, are generated by a known aircraft flight control 164, which typically forms no part of the FADEC control 158. The aircraft flight control 164 is responsive to various pilot inceptors 166, such as the throttle or power lever, together with other known pilot-initiated devices such as the control stick and foot pedals. In response, the aircraft flight control 164 provides the requested or desired thrust signal for the engine and lift fan, along with the desired or requested position for the pitch of the STOVL aircraft 102.

Other sensed engine and lift fan parameters that are input to the FADEC control 158 for use in the present invention on corresponding signal lines include the pressure (P2LF on a line 168) and temperature (T2LF on a line 170) at the lift fan inlet, the speed of the drive shaft (N3 on a line 172), the pressure (P2 on a line 174) and temperature (T2 on a line 176) at the engine fan inlet, and the burner pressure (P32 on a line 178). These parameters are utilized by the FADEC control 158 in implementing the rapid response attitude control logic of the present invention, as described in detail hereinafter with respect to FIG. 3.

In a preferred exemplary embodiment, the FADEC control 158 comprises a central processing unit ("CPU") 180 for executing software instructions that carry out the control functions for the engine 100, including those that embody the control logic of the present invention. This control logic includes schedules or function generators for various engine operating parameters, as shown in FIG. 3. The CPU 180 may comprise a commercially available microprocessor. The FADEC control 158 also comprises memory 182 for storing the software instructions, along with various data, including calculations. The FADEC control 158 outputs a control signal, LFVV, on a line 184 to the actuator 150 for the lift fan variable vanes 148. The FADEC control 158 also outputs a control signal, AJ, on a line 186 to an actuator 188 that controls the area of the engine exhaust nozzle 138. The control logic that generates these signals as described in detail hereinafter in FIG. 3 with respect to a preferred exemplary embodiment of the present invention.

Referring now to FIG. 2, there illustrated in cross section is a portion of the STOVL aircraft 102 having the FADEC control 158 of FIG. 1 implemented therein. As mentioned herein before, FIG. 2 is essentially a reproduction of FIG. 5 of U.S. Pat. No. 5,209,428. Left and right roll control ducts 122 are connected through the engine casing 118 and to the outer annular passageway 116 downstream of the fan exhaust and upstream of the plurality of doors 128. These ducts 122 extend outward within the corresponding aircraft wings 126 and terminate in left and right downward directed variable cross-sectional area roll control nozzles 124. Also provided are control valves 131 that control the flow into the ducts, while the nozzles 124 control the rate of airflow for roll control of the aircraft 102. Fan exhaust air is selectively directed through the ducts 122 and vertically downward and out the nozzles 124 to generate variable lifting forces that control the roll attitude of the STOVL aircraft 102.

Referring now to FIG. 3, there illustrated in detail is the control logic implemented as software instructions stored in the memory portion 182 of the FADEC control 158 and executed by the CPU portion 180 of the FADEC control 158. The control logic generally comprises scedules or function generators that schedule a commanded area for the engine exhaust nozzle 138 (AJ), together with a commanded position for the lift fan variable vanes 148 (LFVV), based on a number of sensed and commanded engine parameters. The result of the commanded AJ and LFVV signals, generated according to the present invention, is to generate appropriate exhaust nozzle thrust and lift fan thrust to adjust the pitch attitude of the STVL aircraft 102. This is done while keeping the speed of the fan and/or low-pressure compressor rotor essentially constant. Also held essentially constant are the speed of the high-pressure rotor, the fuel flow to the engine 100, and the overall engine pressure ratio. With such a constant low rotor speed, it has been proven experimentally that the desired rapid response of the aircraft 102 to pilot-initiated pitch commands is In FIG. 3 a first function generator or schedule 190 schedules the angle of the lift fan variable vanes 148 (LFVV) as a function of the commanded aircraft thrust and pitch, along with various measured lift fan parameters (e.g., T2LF, P2LF and N3). The schedule 190 comprises a graph of vane angle position as a function of commanded pitch and thrust. The various measured engine parameters are utilized in a known manner when calculating the vane angle. Indicated on the graph are a number of lines of requested engine thrust (FN). Essentially, the greater the degree of opening of the vanes 148, the greater the amount of thrust produced by the lift fan 134. As mentioned above, this thrust developed by the lift fan 134 is utilized in conjunction with engine thrust to control the pitch attitude of the STOVL aircraft 102.

The output of this function generator 190 is the commanded vane angle signal (LFVV) on the line 184 to control the angle of the lift fan variable vanes 148.

Also in FIG. 3, a second function generator 192 schedules a base value for the position of the engine rear exhaust nozzle 138 (AJ) as a function of the commanded aircraft thrust and pitch, along with various measured engine operating parameters (e.g., T2, P2 and P32). Similar to the vane angle, the various measured engine parameters are utilized in a known manner when calculating the nozzle area. As is well known, the position of the variable moveable portions of the exhaust nozzle 138 (e.g., flaps) control the area of the opening of the nozzle. In turn, the area of the nozzle opening controls the amount of thrust produced by the gas turbine engine 100. According to the present invention, the engine thrust is utilized in conjunction with the lift fan thrust to control the pitch attitude of the STOVL aircraft 102. Similar to the first function generator or schedule 190, the schedule 192 of nozzle area versus commanded thrust and pitch contains a number of lines of requested thrust (FN). As is well known for a shaft-driven lift fan of this type, the greater the area of nozzle opening then the lower the amount of engine thrust. The output of this function generator 192 is the commanded nozzle area signal (AJ) on the line 186 to control the amount of opening of the engine exhaust nozzle.

The control logic of the present invention has been described and illustrated herein for use in controlling the pitch attitude of the STOVL aircraft 102 while that aircraft operates in a vertical flight mode. However, it should be understood that this is purely exemplary and it is based on the fact that the lift fan 134 is disposed forward of the engine 100 along the longitudinal or front to back axis of the aircraft 102. Instead, the broadest scope of the invention contemplates its application to control of the roll attitude and/or the yaw attitude of the aircraft 102.

For controlling roll, one or more lift fans 134, similar to the lift fan 134 described and illustrated herein, would be situated in the corresponding wings 126 of the aircraft 102. Then, by controlling the thrust produced by both the lift fans and the engine (in a similar manner to that described herein), then the roll attitude of the aircraft may be controlled.

On the other hand, for controlling yaw, one or more lift fans 134 may be disposed in the wings 126 of the aircraft 102, similar to that for the control of aircraft roll. However, for aircraft yaw control the direction of the lift fan exhaust would be directed horizontally, instead of vertically. Nevertheless, the thrust of both the lift fans and the engine would be controlled in a similar manner to that described and illustrated herein for the control of aircraft pitch.

The control logic of the present invention has been described and illustrated herein for use with a gas turbine engine 100 having a lift fan 134 selectively coupled to the engine by means of a direct mechanical connection (i.e., the drive shaft 140). However, the invention is not limited as such. Instead, the control logic of the present invention is independent of the type of connection employed between the lift fan 134 and the engine 100. For example, the control logic of the present invention may be utilized with a lift fan that is aerodynamically coupled to the engine.

The control logic of the present invention has been described and illustrated herein in a preferred exemplary embodiment as being implemented in software executed by a computer processor 180 located in a digital electronic engine control 158. However, instead the invention may be embodied entirely in electronic hardware, either digital and/or analog, or in a combination of hardware and software. In the alternative, the invention may be embodied in a hydro-mechanical control, an electromechanical control, or the like. Such alternative ways of embodying the control logic of the present invention should be readily apparent to one of ordinary skill in the art in light of the teachings herein.

Although the present invention has been shown and described with respect to the detailed embodiments thereof, it will be understood by those skilled in the art that various other changes in the form and detail thereof may be made without departing from the broadest scope of the claimed invention. It suffices for the broadest scope of the present invention that a control 158 for use on a STOVL aircraft 102 having a gas turbine engine 100 selectively connected to a lift fan 134 when the aircraft operates in a vertical flight mode provides for rapid response attitude control of the aircraft when a desired change in aircraft attitude is initiated. The control achieves the rapid thrust response by varying both the inlet guide vanes 148 of the lift fan and the area of the engine exhaust nozzle 138. These variations result in a substantially constant low rotor speed, which facilitates the desired rapid attitude response.

Having thus described the invention, what is claimed is:

1. A control system for a gas turbine engine disposed on an aircraft, the aircraft also having a lift fan, the engine being coupled to the lift fan during operation of the aircraft in a vertical mode of flight, the engine having a compressor and a turbine connected together in a rotatable spool, the engine having an exhaust nozzle with an opening that is controllable to thereby control an amount of thrust produced by the engine, the lift fan having airflow passing therethrough in a controlled manner, the lift fan also having a plurality of variable vanes that are controllable to control the airflow passing through the lift fan to thereby control an amount of thrust produced by the lift fan, the control system comprising:

means for sensing a parameter indicative of a corresponding operating condition of the engine and for providing a sensed engine signal indicative thereof;

means for sensing a parameter indicative of a corresponding operating condition of the lift fan and for providing a sensed lift fan signal indicative thereof;

means, responsive to a desired change in attitude of the aircraft operating in a vertical mode of flight, for providing at least one commanded attitude signal indicative of the desired change in the attitude of the aircraft; and signal processing means, responsive to the sensed engine signal and to the sensed lift fan signal and to the commanded attitude signal, for controlling the opening of the exhaust nozzle and for controlling the amount of airflow passing through the lift fan, wherein the opening of the exhaust nozzle and the amount of airflow passing through the lift fan are both in an amount to keep substantially constant a speed of the rotatable spool, wherein by keeping substantially constant the speed of the rotatable spool the control system provides for relatively rapid response of the aircraft to the desired change in the attitude of the aircraft.

2. The control system of claim 1, wherein the signal processing means is responsive to the sensed engine signal and to the sensed lift fan signal and to the commanded attitude signal for controlling an angle of the variable vanes to thereby control the amount of airflow passing through the lift fan.

3. The control system of claim 1, wherein the signal processing means further comprises means for controlling the amount of airflow passing through the lift fan based on a predetermined schedule of an angle of the variable vanes as a function of a commanded thrust of the lift fan.

4. The control system of claim 1, wherein the signal processing means further comprises means for controlling the opening of the exhaust nozzle based on a predetermined schedule of the amount of opening of the exhaust nozzle as a function of a commanded thrust of the engine.

5. The control system of claim 1, wherein the means for sensing a parameter indicative of a corresponding operating condition of the engine and for providing a sensed engine signal indicative thereof further comprises means for sensing at least one temperature of the engine and for providing at least one corresponding sensed temperature signal indicative thereof, for sensing at least one pressure of the engine and for providing at least one corresponding sensed pressure signal indicative thereof, and for sensing at least one speed of the engine and for providing at least one corresponding sensed speed signal indicative thereof, and wherein the signal processing means is responsive to the at least one sensed temperature signal and is responsive to the at least one sensed pressure signal and is responsive to the at least one sensed speed signal for controlling the opening of the exhaust nozzle.

6. The control system of claim 1, wherein the means for sensing a parameter indicative of a corresponding operating condition of the lift fan and for providing a sensed lift fan signal indicative thereof further comprises means for sensing at least one temperature of the lift fan and for providing at least one corresponding sensed temperature signal indicative thereof, and for sensing at least one pressure of the lift fan and for providing at least one corresponding sensed pressure signal indicative thereof, and wherein the signal processing means is responsive to the at least one sensed temperature signal and is responsive to the at least one sensed pressure signal for controlling the amount of airflow passing through the lift fan.

7. The control system of claim 1, wherein the gas turbine engine and the lift fan are disposed within the aircraft wherein the signal processing means is responsive to the sensed engine signal and to the sensed lift fan signal and to the commanded attitude signal for controlling the opening of the exhaust nozzle and for controlling the amount of airflow passing through the lift fan to thereby control the pitch attitude of the aircraft.

8. The control system of claim 1, wherein the gas turbine engine and the lift fan are disposed within the aircraft wherein the signal processing means is responsive to the sensed engine signal and to the sensed lift fan signal and to the commanded attitude signal for controlling the opening of the exhaust nozzle and for controlling the amount of airflow passing through the lift fan to thereby control the roll attitude of the aircraft.

9. The control system of claim 1, wherein the gas turbine engine and the lift fan are disposed within the aircraft wherein the signal processing means is responsive to the sensed engine signal and to the sensed lift fan signal and to the commanded attitude signal for controlling the opening of the exhaust nozzle and for controlling the amount of airflow passing through the lift fan to thereby control the yaw attitude of the aircraft.

10. A control system for an aircraft operable in a vertical mode of flight and having a gas turbine engine and a lift fan, the engine being coupled to the lift fan during the vertical mode of flight, the engine having an exhaust nozzle with an opening that is controllable to thereby control an amount of thrust provided by the engine, the engine also having a compressor and a turbine connected together in a spool, the lift fan having airflow passing therethrough in a controlled manner to thereby control an amount of thrust provided by the lift fan, the control system comprising:

first processing means, responsive to a signal indicative of an engine operating parameter and responsive to a signal indicative of a lift fan operating parameter and responsive to a signal indicative of a commanded thrust output of the engine, for controlling an amount of opening of the exhaust nozzle; and second processing means, responsive to a signal indicative of an engine operating parameter and responsive to a signal indicative of a lift fan operating parameter and responsive to a signal indicative of a commanded thrust output of the engine, for controlling the amount of airflow passing through the lift fan;

wherein the amount of opening of the exhaust nozzle and the amount of airflow passing through the lift fan are both in an amount to keep substantially constant a speed of the compressor and turbine spool;

wherein by keeping substantially constant the speed of the compressor and turbine spool the control system provides or relatively rapid response of the aircraft to a commanded attitude of the aircraft.

11. The control system of claim 10, wherein the lift fan has a plurality of inlet guide vanes operable to control an amount of airflow directed into an inlet of the lift fan, and wherein the second signal processing means comprises means for controlling the amount of airflow passing through the lift fan by controlling the angle of the plurality of inlet guide vanes.

12. The control system of claim 11, wherein the first processing means further comprises means for controlling the amount of opening of the exhaust nozzle based on a predetermined schedule of a the amount of opening of the exhaust nozzle as a function of a commanded thrust of the engine.

13. The control system of claim 11, wherein the second processing means further comprises means for controlling the amount of airflow passing through the lift fan based on a predetermined schedule of a position of the lift fan as a function of a commanded thrust of the engine.

14. An attitude control system for an aircraft selectively operable in both horizontal and vertical modes of flight, the aircraft having a gas turbine engine and a lift fan disposed within the aircraft in a predetermined physical relationship, the engine being coupled to the lift fan during a vertical mode of flight, the engine having an exhaust nozzle with an opening that is controllable in a variable amount to thereby control an amount of thrust provided by the engine, the engine also having a compressor and a turbine connected together in a rotatable spool, the lift fan having airflow passing therethrough in a controlled manner to thereby control an amount of thrust provided by the lift fan, the control system comprising:

first processing means, responsive to a signal indicative of a commanded attitude of the aircraft, for controlling the amount of thrust provided by the engine by controlling the amount of the variable opening of the exhaust nozzle, wherein the amount of the variable opening of the exhaust nozzle is in an amount to keep substantially constant a speed of the compressor and turbine spool; and second processing means, responsive to a signal indicative of a commanded attitude of the aircraft, for controlling the amount of thrust provided by the lift fan by controlling the a mount of airflow passing through the lift fan, wherein the amount of airflow passing through the lift fan is in an amount to keep substantially constant a speed of the compressor and turbine spool.

15. The attitude control system of claim 14, wherein the lift fan has a plurality of inlet guide vanes operable to control an amount of airflow directed into an inlet of the lift fan, and wherein the second signal processing means comprises means for controlling the amount of airflow passing through the lift fan by controlling the angle of the plurality of inlet guide vanes.

16. The attitude control system of claim 14, wherein the first processing means further comprises means for controlling the amount of opening of the exhaust nozzle based on a predetermined schedule of a the amount of opening of the exhaust nozzle as a function of a commanded thrust of the engine.

17. The attitude control system of claim 14, wherein the second processing means further comprises means for controlling the amount of airflow passing through the lift fan based on a predetermined schedule of a position of the lift fan as a function of a commanded thrust of the engine.

18. The attitude control system of claim 14, wherein the predetermined physical relationship of the gas turbine engine and the lift fan disposed within the aircraft is such that the first processing means and the second processing means comprise means, in combination, for controlling the pitch attitude of the aircraft.

19. The attitude control system of claim 14, wherein the predetermined physical relationship of the gas turbine engine and the lift fan disposed within the aircraft is such that the first processing means and the second processing means comprise means, in combination, for controlling the roll attitude of the aircraft.

20. The attitude control system of claim 14, wherein the predetermined physical relationship of the gas turbine engine and the lift fan disposed within the aircraft is such that the first processing means and the second processing means comprise means, in combination, for controlling the yaw attitude of the aircraft.

* * * * *